United States Patent
Edling et al.

(10) Patent No.: US 8,248,723 B1
(45) Date of Patent: Aug. 21, 2012

(54) SYSTEM AND METHOD FOR MANAGING ERRORS ON A MAGNETIC TAPE

(75) Inventors: Dwayne A. Edling, Mead, CO (US); Ryan P. McCallister, Erie, CO (US)

(73) Assignee: Oracle International Corporation, Redwood City, CA (US)

( * ) Notice: Subject to any disclaimer, the term of this patent is extended or adjusted under 35 U.S.C. 154(b) by 7 days.

(21) Appl. No.: 13/018,228

(22) Filed: Jan. 31, 2011

(51) Int. Cl.
G11B 27/36 (2006.01)

(52) U.S. Cl. .......................................... 360/31

(58) Field of Classification Search ............... 360/31, 360/69, 71, 73.04, 77.12; 711/4, 112, 202
See application file for complete search history.

(56) References Cited

U.S. PATENT DOCUMENTS

| | | | |
|---|---|---|---|
| 5,596,736 A * | 1/1997 | Kerns | 711/4 |
| 6,571,309 B2 * | 5/2003 | Ando et al. | 711/4 |
| 6,594,725 B2 * | 7/2003 | Ando et al. | 711/112 |
| 7,516,296 B2 * | 4/2009 | Chang et al. | 711/202 |

* cited by examiner

Primary Examiner — Fred Tzeng
(74) Attorney, Agent, or Firm — Brooks Kushman P.C.

(57) ABSTRACT

Systems and methods for managing errors on a magnetic tape having a plurality of partitions accessed by a tape drive having an associated tape drive processor in communication with a host computer having an associated host processor include receiving mapping information from the host computer that designates at least first and second logically adjacent partitions for reading/writing consecutive data, receiving a read/write request to transfer the consecutive data for the first and second partitions, detecting a data error when attempting to read/write the data for the second partition and communicating a corresponding data error message to the host computer, and receiving modified mapping information from the host computer that designates a third partition as logically adjacent to the first partition for reading/writing the consecutive data.

20 Claims, 4 Drawing Sheets

SYSTEM AND METHOD FOR MANAGING ERRORS ON A MAGNETIC TAPE

TECHNICAL FIELD

The present disclosure relates to systems and methods for managing errors encountered during reading and/or writing data for a magnetic tape.

BACKGROUND

Network servers and other host computers may use different types of peripheral storage devices having different capacities, access times, and other operating characteristics suitable for various applications. Enterprise and data center solutions may employ multiple complementary data storage devices to achieve desired data availability, reliability, security, long-term accessibility, and cost effectiveness, among other considerations. Many networks use an automated schedule to archive data for long-term storage. Long-term storage devices may be implemented using a wide variety of storage technologies including magnetic and optical disk drives, solid-state drives, tape drives, or other types of storage devices. However, compromises among performance, capacity, and cost are often required. Tape drives continue to provide cost-effective, reliable, and energy efficient long-term data storage, particularly for high-volume backups, long-life archives, disaster recovery/business continuity, compliance, and various other applications that include inactive data.

Discrete tape partitioning involves dividing a storage tape into multiple discrete partitions to address the time and expense required in reclaiming storage tapes by allowing a particular partition to be rewritten once data has expired from that partition. However, data stored within a particular partition must still be appended to any previously stored data, which may affect time required for storage and subsequent retrieval of the data. Furthermore, while discrete tape partitioning has existed for many years, it has significant drawbacks and has been unpopular with developers as it requires the host to track which partitions contain valid data as well as the locations of the data objects or host files stored within the tape partitions. The host application is involved in processing at the end of each partition to properly direct an archive device (e.g., a tape drive) to the next applicable partition in both read and write operations.

Linear magnetic tape formats have traditionally been used as bulk media that is sequentially accessed. Data is added to the tape by appending the data to the last written location until the tape is full. Various strategies for data error detection and correction may be employed when writing data and/or reading data from linear magnetic tape. Error detection strategies ensure data integrity and may work in conjunction with data correction strategies, which attempt to correct various types of errors. Some errors that may be encountered when writing data to the magnetic tape, such as those related to defects or deterioration of the tape media, for example, may not be accommodated by the error correction techniques. As a result, due to the sequential nature of linear magnetic tape formats, a magnetic tape cartridge that encounters such an error would be retired and could not be used to write data to any remaining locations on the tape. While the tape may still be used for reading previously stored data, a substantial portion of the tape capacity may be lost.

SUMMARY

A system or method for managing data errors associated with transferring data between a host computer and one of a plurality of magnetic tapes each having at least first, second, and third linkable partitions and loadable into a tape drive in communication with the host computer include linking the first partition to the third partition in response to receiving a data error when transferring data associated with the second partition previously linked to the first partition.

Various embodiments include systems and methods for managing errors on a magnetic tape having a plurality of partitions accessed by a tape drive having an associated tape drive processor in communication with a host computer having an associated host processor include receiving mapping information from the host computer that designates at least first and second logically adjacent partitions for reading/writing consecutive data, receiving a read/write request to transfer the consecutive data for the first and second partitions, detecting a data error when attempting to read/write the data for the second partition and communicating a corresponding data error message to the host computer, and receiving modified mapping information from the host computer that designates a third partition as logically adjacent to the first partition for reading/writing the consecutive data In one embodiment a computer data storage system that manages data errors associated with transferring data between devices includes a tape drive having an associated processor and memory for writing and reading data on an associated magnetic tape having at least first, second, and third linkable partitions, the tape drive linking the first partition to the third partition in response to receiving a data error when transferring data associated with the second partition that was previously linked to the first partition. The system may also include a host computer in communication with the tape drive, the host computer changing partition linking information to link the first partition to the third partition in response to receiving a data error from the tape drive. The host computer may communicate a bit mask to the tape drive that provides linking information for linking logically adjacent partitions. The tape drive processor may transfer the bit mask to a tape drive memory for subsequent use in reading and/or writing data to logically adjacent partitions on the magnetic tape. In addition, the tape drive may write information to the first partition that identifies the third partition and write information to the third partition that identifies the first partition as logically adjacent partitions to link the first partition to the third partition.

Embodiments according to the present disclosure provide various advantages. For example, systems and methods for managing errors on a magnetic tape according to embodiments of the present disclosure allow applications to map data storage around errors as they are encountered on the tape to facilitate continued use of the tape for subsequent writing of data. In addition to mapping around errors on the magnetic tape, various embodiments of the present disclosure may be used to reduce read errors and read or recover additional data that may otherwise be inaccessible using traditional strategies.

The above advantages and other advantages and features of the present disclosure will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
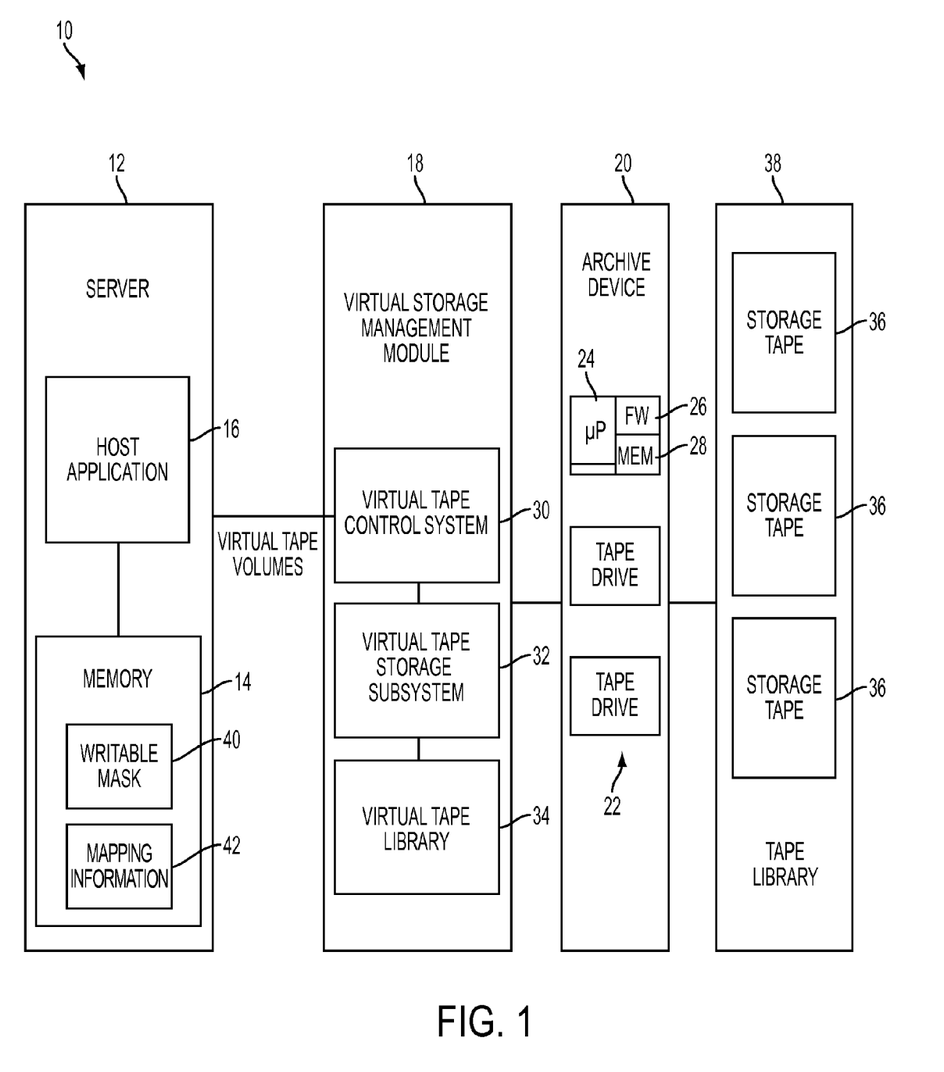
FIG. 1 is a block diagram illustrating operation of a representative system or method for managing errors on magnetic tape according to embodiments of the present disclosure.

Referring now to FIG. 1, a representative embodiment of a computer data storage system demonstrates operation of a system or method for managing errors on a magnetic tape according to the present disclosure. In the simplified functional block diagram of FIG. 1, system 10 includes a host computer or server 12 (e.g., a mainframe server) having an associated memory 14 and microprocessor that runs a host application 16. Host computer 12 may be used to manage or coordinate control of data storage in one or more logical data volumes that may also be referred to as virtual tape volumes (VTVs). An optional virtual storage management module 18 may be used in conjunction with one or more associated archive devices 20. Virtual storage management module 18 may reside within host computer or server 12, or it may be located independent of the server 12 at any appropriate network location depending on the particular application and implementation, for example. Archive device 20 may include one or more data storage devices 22, such as magnetic tape drives, for example. Each storage device 22 may include an associated microprocessor 24 in communication with firmware (FW) 26 and various other types of memory 28.

Virtual storage management module 18 may perform various functions associated with storing and retrieving data from archive device 20. For example, virtual storage management module 18 may include a virtual tape storage control system (VTCS) 30 that communicates with host application 16 and directs a virtual tape storage subsystem (VTSS) 32. In turn, the VTSS routes host files either to archive device 20 or to a virtual tape library 34. According to various embodiments of the present disclosure, VTVs may be assigned or allocated to corresponding partitions and/or sections on magnetic media associated with one or more storage tapes or cartridges 36 that are housed within a tape library 38. Archive device 20 may access tapes housed within tape library 38 and loaded or mounted manually or using any of a number of automatic devices, including robotic assemblies that assist archive device 20 in selecting, mounting, and dismounting one of the storage tapes 36, for example. Virtual tape library 34 may be used to buffer or temporarily cache VTVs, which may ultimately be written to one or more partitions or sections of storage tapes 36 as described in greater detail herein.

As also illustrated in FIG. 1, host computer 12 may include a writable partition mask 40 and mapping information 42 used to manage data storage on available partitions and to allocate or associate at least one of a plurality of sections on storage tape 36 with a logical data volume designated by host computer 12 via host application 16 or related software, for example. In operation, system 10 performs a method for managing errors on a magnetic tape 36 having at least first, second, and third linkable partitions and accessed by a tape drive 22 having an associated tape drive processor 24 in communication with a host computer 12 having an associated host processor that includes linking the first partition to the third partition in response to receiving a data error when transferring data associated with the second partition previously linked to the first partition. System 10 may read and/or write data in at least one partition within a logical volume having an associated number of sections designated by host computer 12 from a predetermined number of sections associated with magnetic tape 36, wherein each partition extends across one section. Alternatively, tape 36 may not be divided into configurable sections. In one embodiment, archive device 20 and tape drive 22 receive mapping information in the form of a writable partition mask 40 from host computer 12, which designates logically adjacent writable partitions for writing consecutive or streaming data on magnetic tape 36. Tape drive processor 24 uses mapping information 42 contained within writable mask 40 received from host computer 12 to control writing data to partitions designated by mask 40 without requiring additional communication with host computer 12. Host computer 12 may modify mapping information 42 designating logically adjacent partitions in response to an error message received from tape drive 22 to alter the partition linking information to avoid any problematic partitions as described in greater detail herein.

Figure 2:
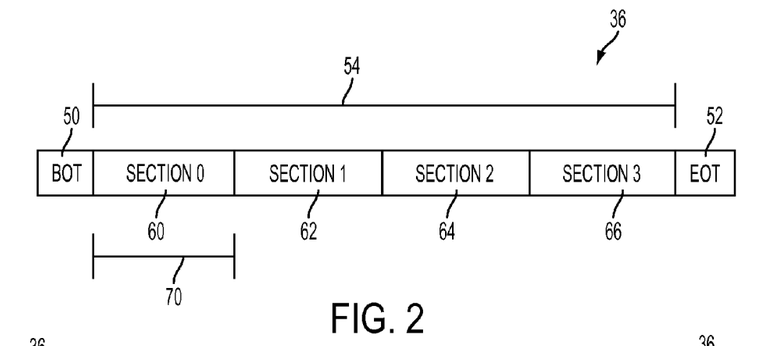
FIG. 2 is a block diagram illustrating a representative physical tape layout for a tape having a plurality of sections and selectively linkable partitions used to manage tape errors according to embodiments of the present disclosure.

Referring now to FIG. 2, a diagram illustrating a physical tape layout for a magnetic tape having a plurality of sections configurable by a host computer according to embodiments of the present disclosure is shown. Magnetic tape 36 generally includes a beginning-of-tape (BOT) area or region 50, an end-of-tape area 52 and a data area 54. BOT 50 is a physical feature of magnetic tape 50 that can be used by tape drive 22 to detect the beginning of the data area 54. BOT 50 may also generally refer to the leader portion of magnetic tape 36 that allows the tape to be loaded, threaded through the transport and take-up reel and advanced to data region 54 for subsequent reading or writing data when the volume is mounted. Similarly, EOT 52 may be used by tape drive 22 to detect the end of data region 54 or end of tape. A separate end of data designator (not shown) may also be used. Traditional tape drives read/write data to the tape by moving the tape from BOT 50 to EOT 52 before reversing the direction of tape travel from EOT 52 to BOT 50 to read/write data in a serpentine fashion. In contrast, various embodiments for archiving data according to the present disclosure include reversing tape direction at section boundaries to read or write data in a serpentine fashion within at least one section associated with a logical volume designated by the host computer as described in greater detail herein. Other embodiments of the present disclosure do not utilize configurable sections of partitions and read/write tape 36 in a conventional fashion.

Magnetic tape 36 includes a data area 54 that may be divided into a plurality of sections 60, 62, 64, 66. For embodiments that use multiple sections, each section 60, 62, 64, 66 extends vertically substantially across the width of tape 36. The predetermined number of sections associated with magnetic tape 36 (four in this example) cumulatively extend across substantially the entire data portion 54 from BOT 50 to EOT 52. In one embodiment, magnetic tape 36 is implemented by a ½" wide magnetic tape having a data portion length of about 279 meters with each section 60, 62, 64, 66 having a section length 70 of about 69 meters. Sections 60, 62, 64, and 66, each include a plurality of partitions as generally illustrated and described with respect to FIGS. 3-5.

Figure 3:
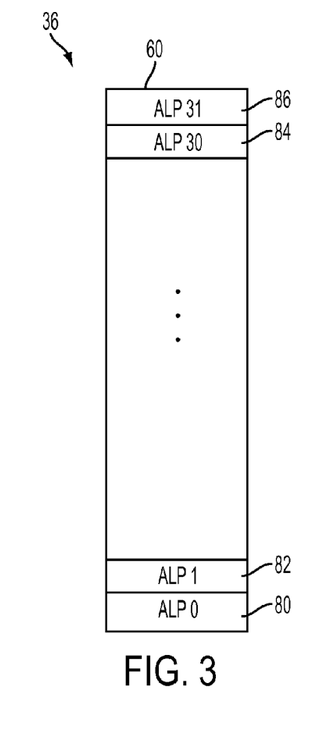
FIG. 3 illustrates a logical tape layout for a tape section having a plurality of partitions used for managing tape errors according to embodiments of the present disclosure.

FIG. 3 is a diagram illustrating a logical magnetic tape layout for a representative tape section according to embodiments of the present disclosure. Representative tape section 60 includes a plurality of partitions that may be generally vertically stacked or arranged within section 60 across the width of tape 36 as generally represented by partitions 80, 82, 84, and 86. In embodiments that do not use sections, the partitions are generally arranged sequentially from the BOT to EOT in a serpentine fashion similar to those illustrated in FIG. 5. In one embodiment, tape 36 includes automatically linked partitions (ALPs) that include information for identifying a logically adjacent partition such that reading or writing from a designated partition to the logically adjacent partition is controlled by the tape drive processor 24 (FIG. 1) rather than the host computer 12 (FIG. 1), although the host computer may communicate mapping information using writable mask 40 (FIG. 1), for example, to tape drive 22, which is stored in memory 28. For example, logically adjacent partitions designated by mapping information 42 and communicated using a writable mask 40 to tape drive 22 may identify partitions 80 (ALP 0) and 84 (ALP 30) as being linked or logically adjacent. During writing of these partitions, tape drive 22 writes information in partition 80 (ALP 0) that identifies or points to partition 84 (ALP 30) as the next partition. Similarly, information is written to partition 84 (ALP 30) identifying partition 80 (ALP 0) as the previous partition to link the partitions. Consecutive data is then written and subsequently read from partition 80 followed by partition 84.

Referring now to FIGS. 1-3, magnetic tape 36 includes at least first partition 80 (ALP 0), second partition 84 (ALP 30), and third partition 86 (ALP 31) that may be selectively linked by host computer 12 using mapping information 42 and writable mask 40. Tape drive 22 receives mapping information 42 via writable mask 40 and transfers the information to tape drive memory 28. In this example, the mapping information designates first partition 80 and second partition 84 as being logically adjacent or linked. Host computer 12 sends a request to tape drive 22 to write data to logically adjacent partitions 80, 84. Tape drive 22 begins writing the data to partition 80 based on the stored mapping information in tape drive memory 28. Tape drive 22 continues writing data until partition 80 is filled and begins writing data to partition 84, but detects errors while writing the data to partition 84. In response, tape drive 22 communicates a data error to host computer 12. In response, host computer 12 modifies mapping information 42 designating the logically adjacent partitions to substitute the third partition 86 in place of the second partition 84 and communicates the modified mapping information to tape drive 22. Upon receiving the modified mapping information and transferring the modified mapping information to tape drive memory 28, tape drive 22 writes the data to the third partition 86.

Tape drive 22 may also write linking information to each partition to identify or point to the logically adjacent partition(s). In this example, tape drive would first write information to partition 80 identifying partition 84 as the next partition based on the stored mapping information. After the error is encountered and modified mapping information is received, tape drive 22 writes linking information to the first partition 80 to identify the third partition 86, and writes linking information to the third partition 86 to identify the first partition 80 as logically adjacent partitions.

A similar process may be performed when reading data from tape 36. For example, host computer 12 may send a read request along with corresponding mapping information 42 encoded in a bitmask 40 or other data structure to tape drive 22. The mapping information may identify partitions 80, 82, 84 as being logically adjacent partitions. Tape drive 22 proceeds to read data from partition 80 and uses the mapping information stored in tape drive memory 28 to advance to the next logical partition 82. During reading of partition 82, tape drive 22 detects errors and communicates an associated data error message to host computer 12. Host computer 12 modifies the mapping information to eliminate the problematic partition 82 and communicates the modified mapping information identifying partitions 80, 84 as logically adjacent to tape drive 22, which uses the modified information to read data from partitions 80, 84 and transfer the data to host computer 12. Tape drive 22 may write the updated linking information to partitions 80, 84 as previously described to link these partitions for subsequent reading and/or writing. While some data loss may occur for data contained within the unreadable partition 82, the remaining data may be recovered. In addition, other data located physically downstream of the damaged or unreadable partition is not affected.

As can be seen by the above examples, the error management strategies described herein allow the tape cartridge to continue to be used for reading and/or writing of data after encountering a read and/or write error associated with one or more partitions in contrast to various prior art strategies where the tape may be retired from subsequent writing and downstream data may not be recoverable.

In applications utilizing tape sections, representative partitions 80, 82, 84, 86 (and all intervening partitions not explicitly illustrated) extend substantially entirely across the length of an associated section 60. The number of sections per tape and the number of partitions per section may vary by application and implementation. Likewise, a single section or equivalently no sections, may be used in a system or method for managing errors on magnetic tape according to various embodiments of the present disclosure.

Figure 4:
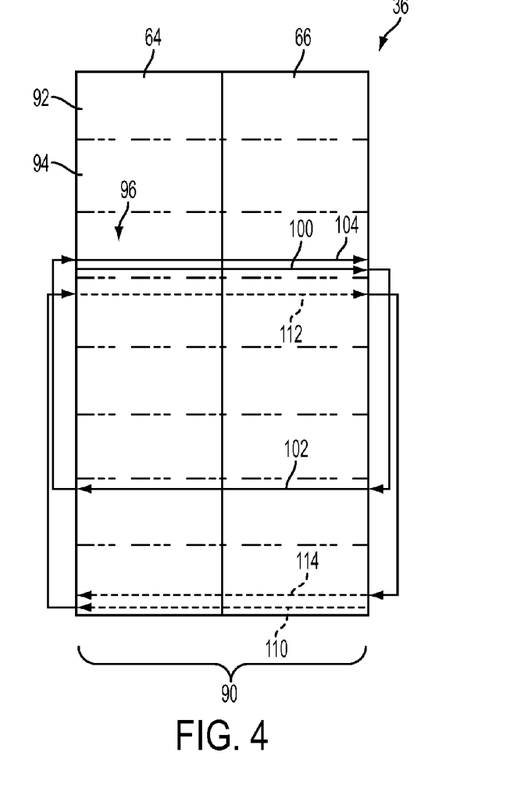
FIG. 4 illustrates a physical tape layout for a tape section having a plurality of partitions used for managing tape errors according to embodiments of the present disclosure.
Figure 5:
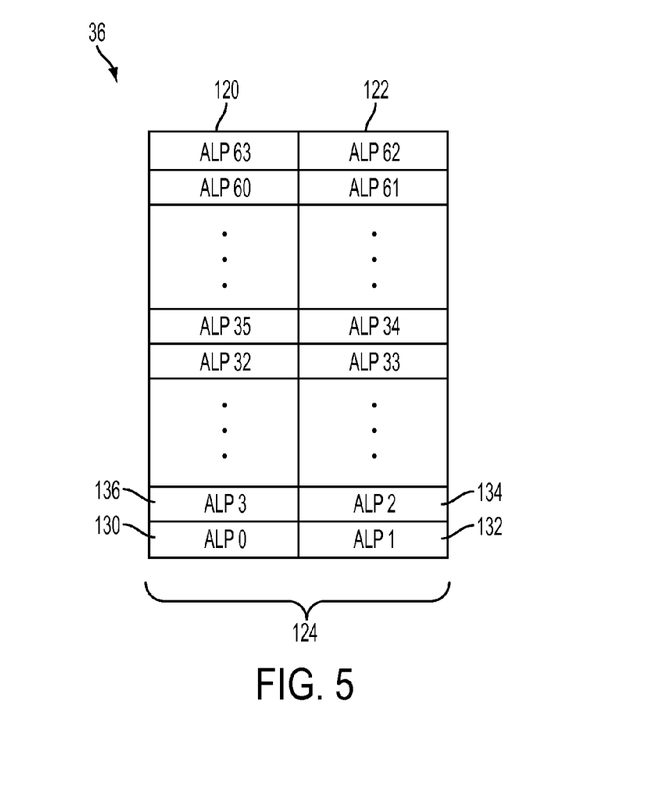
FIG. 5 illustrates a logical tape layout for a tape having multiple sections each having multiple partitions associated with a single logical volume used for managing errors according to embodiments of the present disclosure.

FIG. 4 is a diagram illustrating a physical magnetic tape layout for a representative logical volume having two sections according to various embodiments of the present disclosure. In the representative example of FIG. 4, logical volume 90 includes adjacent tape sections 64, 66 each having a plurality of partitions as generally illustrated in FIGS. 3 and 5. The host computer may designate the number of sections to be included in a particular logical volume 90 to balance data access time and storage capacity of a particular volume. For example, defining or associating a logical volume with a single section, such as illustrated in FIG. 3, would result in a smaller available storage capacity for that logical volume and faster data access as compared to associating two (or more) sections with the logical volume as illustrated in FIG. 4, resulting in twice the storage capacity but longer data access times.

As also shown in FIG. 4, magnetic tape 36 generally includes a plurality of data bands, generally represented by data bands 92, 94. Each data band may include a plurality of data tracks, generally represented by tracks 96, for storing data. Tape 36 may also include one or more servo tracks (not shown) that may be used in aligning the read/write heads as known. Data written to a single partition may be spread across multiple tracks within sections 64, 66 associated with a logical data volume 90, depending on the particular size of the tape, number of partitions, number of sections, etc. However, each partition is recorded in only one section. For example, partitions 80, 82 may include data recorded on tracks 100, 102, and 104, while partitions 84, 86 may include data recorded on tracks 110, 112, and 114. As generally indicated in FIG. 4, the tape drive controls direction of travel of tape 36 to reverse tape direction at section boundaries associated with a logical volume to read or write data within the logical volume in a serpentine fashion. For example, track 100 is read/written from section 64 to section 66, where the tape reverses direction to read/write track 102 from section 66 to section 64, where tape direction is again reversed to read/write track 104 from section 64 to section 66. Of course, the tape sections and partitions may be allocated such that data is recorded in a single pass per partition, or some other number of passes per partition depending on the particular application and implementation. Likewise, for embodiments that do not use tape sections, the tape direction may be reversed at EOT and BOT to read/write data to partitions designated by the mapping information in a serpentine fashion.

FIG. 5 illustrates a logical tape layout for a tape having multiple sections each having multiple partitions associated with a single logical volume according to various embodiments of the present disclosure. Similar to logical volume 90 illustrated with respect to the physical layout of tape 36 in FIG. 4, logical volume 124 of FIG. 5 includes two adjacent sections 120, 122. Each section 120, 122 includes a plurality of partitions 130, 132, 134, 136, etc. As shown in FIGS. 3 and 5, each partition 80, 130, etc. fills the width of an associated section 60, 120, respectively, along a corresponding length of tape 36. Partitions 130, 132, 134, 136 are logically adjacent and also consecutively numbered in a serpentine fashion in this example. However, logically adjacent partitions may be physically separated on tape 36 and may not be consecutively numbered, such as described in the example above described with respect to FIGS. 1-3, for example.

Figure 6:
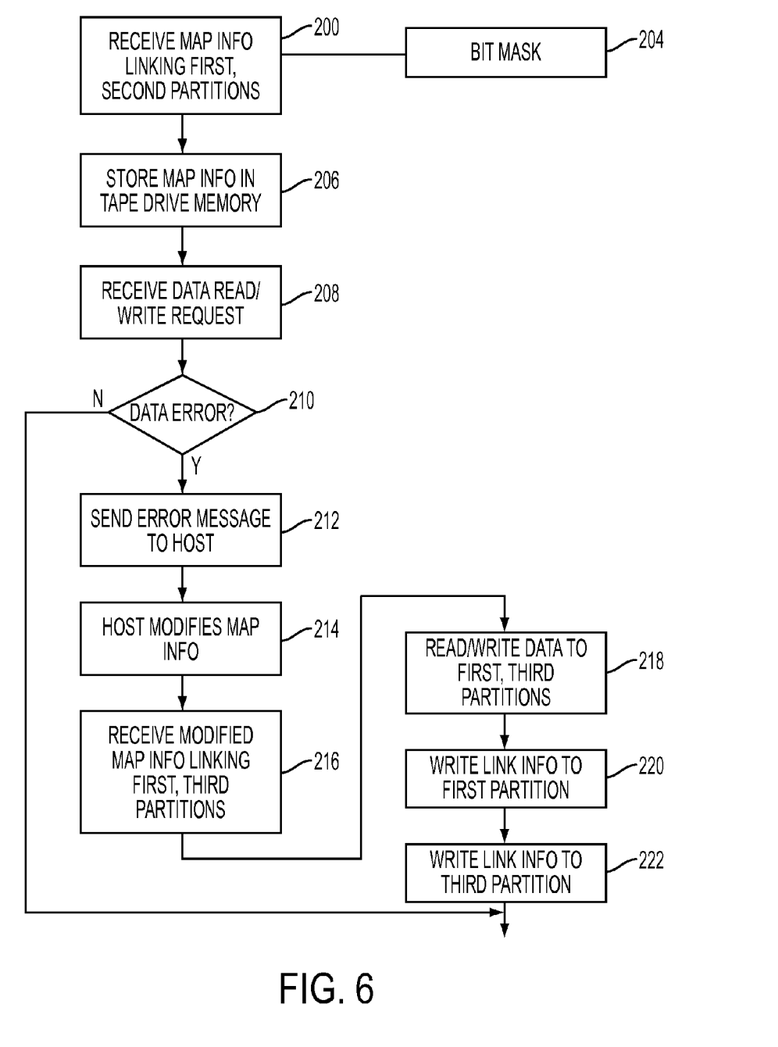
FIG. 6 is a simplified block diagram or flowchart illustrating operation of a system or method for managing errors on a magnetic tape having a plurality of partitions according to embodiments of the present disclosure.

FIG. 6 is a flow chart illustrating operation of one embodiment of a system or method for managing errors on a magnetic tape according to the present disclosure. As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. Likewise, various functions may be omitted depending on the particular implementation. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions may be applicable to various other types of peripheral storage devices.

As generally illustrated in FIG. 6, a system or method for managing errors on a magnetic tape having a plurality of partitions accessed by a tape drive having an associated tape drive processor in communication with a host computer having an associated host processor may include receiving mapping information from the host that designates at least first and second logically adjacent partitions for reading/writing consecutive data as represented by block 200. The mapping information may be communicated from the host computer to the tape drive using an associated bit mask as represented by block 204. The mapping information is then stored in tape drive memory as represented by block 206 so that the tape drive processor can access logically adjacent partitions based on the stored mapping information. A read/write request to transfer data to/from first and second logically adjacent or linked partitions is received by the tape drive as represented by block 208. If the tape drive detects data errors when attempting to read/write the data for the second partition as represented by block 210, then a corresponding error is communicated to the host computer as represented by block 212. The host computer modifies the mapping information and associated bit mask to change the linking information to link the first and third partitions and avoid the problematic second partition as represented by block 214. The modified mapping information is communicated to the tape drive as represented by block 216 and used by the tape drive to read and/or write the data using the first and third partitions as represented by block 218.

As also shown in FIG. 6, the system or method may also include writing information in the first partition that identifies the third partition as a logically adjacent partition as represented by block 220. Similarly, the tape drive may write information to the third partition that identifies the first partition as a logically adjacent partition as represented by block 222.

As illustrated in FIG. 6, for example, a method for managing data errors associated with transferring data between a host computer and one of a plurality of magnetic tapes each having first, second, and third linkable partitions and loadable into a tape drive in communication with the host computer includes linking the first partition to the third partition in response to receiving a data error when transferring data associated with the second partition, which was initially or previously linked to the first partition. As such, the host computer can remap the linked partitions to map around one or more partitions that have experienced an otherwise unrecoverable read and/or write error.

As the previously described representative embodiments illustrate, systems and methods for reading and writing data to magnetic tape according to the present disclosure allow the host computer to configure the magnetic tape storage based on a selected operating point that balances data access time and storage capacity for each logical volume. Embodiments according to the present disclosure allow customers to configure a tape drive using the host computer to meet particular application needs. By managing a library of magnetic tapes, customers can have a variety of capacity/access time characteristics available for different applications. Systems and methods according to the present disclosure provide different fast access storage solutions with a single tape cartridge. The tape cartridge can be sectioned so that users have the flexibility to choose their access time and capacity operating points in increments of section size associated with a particular data volume. For example, assigned only a single section to a volume provides the fastest access time to the data, but the least amount of storage capacity for the volume. Adding more sections to a volume will make access time slower, but will increase storage capacity for the volume. In addition, systems or methods according to the present disclosure may be implemented using existing magnetic tape cartridges in many existing tape drive storage systems by updating tape drive firmware without requiring additional hardware components.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for managing errors on a magnetic tape having a plurality of partitions accessed by a tape drive having an associated tape drive processor in communication with a host computer having an associated host processor, the method comprising:
   receiving mapping information from the host computer that designates at least first and second logically adjacent partitions for reading/writing consecutive data;
   receiving a read/write request to transfer the consecutive data for the first and second partitions;
   detecting a data error when attempting to read/write the data for the second partition and communicating a corresponding data error message to the host computer; and
   receiving modified mapping information from the host computer that designates a third partition as logically adjacent to the first partition for reading/writing the consecutive data.

2. The method of claim 1 further comprising:
   reading/writing the consecutive data using the first and third partitions.

3. The method of claim 1 further comprising:
   modifying the mapping information designating logically adjacent partitions to substitute the third partition in place of the second partition using the host processor in response to receiving the data error message to generate the modified mapping information.

4. The method of claim 1 further comprising writing linking information on the magnetic tape that links the first and third partitions.

5. The method of claim 4 wherein writing linking information comprises:
   writing information in the first partition that identifies the third partition.

6. The method of claim 4 wherein writing linking information comprises
   writing information in the third partition that identifies the first partition.

7. The method of claim 1 further comprising storing the mapping information in the tape drive such that the tape drive processor accesses logically adjacent partitions to access the consecutive data based on the mapping information stored in the tape drive.

8. The method of claim 1 wherein the mapping information and modified mapping information comprise bit masks.

9. The method of claim 1 further comprising maintaining a volume map within the host computer that maps logical volumes to corresponding partitions of the magnetic tape.

10. The method of claim 1 wherein the magnetic tape includes a plurality of sections each having an associated plurality of partitions, a beginning of tape portion, an end of tape portion and a data portion, and wherein the tape drive processor reverses direction of tape travel at section boundaries.

11. A method for managing data errors associated with transferring data between a host computer and one of a plurality of magnetic tapes each having at least first, second, and third linkable partitions and loadable into a tape drive in communication with the host computer, the method comprising:
   linking the first partition to the third partition in response to receiving a data error when transferring data associated with the second partition previously linked to the first partition.

12. The method of claim 11 wherein linking comprises:
   changing partition linking information in the host computer to substitute the third partition for the second partition; and
   transferring the linking information to the tape drive.

13. The method of claim 12 wherein linking comprises:
   writing information to the magnetic tape in response to the linking information transferred to the tape drive from the host computer.

14. The method of claim 12 wherein linking comprises:
   writing information to the first partition that identifies the third partition as a logically adjacent partition; and
   writing information to the third partition that identifies the first partition as a logically adjacent partition.

15. The method of claim 11 further comprising:
   transferring linking information from the host computer to the tape drive as a bit mask; and
   storing the bit mask in tape drive memory for subsequent use in accessing data on an associated magnetic tape.

16. A computer data storage system that manages data errors associated with transferring data between devices, the system comprising:
   a tape drive having an associated processor and memory for writing and reading data on an associated magnetic tape having at least first, second, and third linkable partitions, the tape drive linking the first partition to the third partition in response to receiving a data error when transferring data associated with the second partition that was previously linked to the first partition.

17. The computer data storage system of claim 16 further comprising:
   a host computer in communication with the tape drive, the host computer changing partition linking information to link the first partition to the third partition in response to receiving a data error from the tape drive.

18. The computer data storage system of claim 17 wherein the host computer communicates a bit mask to the tape drive that provides linking information for linking logically adjacent partitions.

19. The computer data storage system of claim 18 wherein the tape drive processor transfers the bit mask to a tape drive memory for subsequent use in reading and/or writing data to logically adjacent partitions on the magnetic tape.

20. The computer data storage system of claim 16 wherein the tape drive writes information to the first partition that identifies the third partition and writes information to the third partition that identifies the first partition as logically adjacent partitions to link the first partition to the third partition.

* * * * *

UNITED STATES PATENT AND TRADEMARK OFFICE
CERTIFICATE OF CORRECTION

PATENT NO. : 8,248,723 B1
APPLICATION NO. : 13/018228
DATED : August 21, 2012
INVENTOR(S) : Edling et al.

Page 1 of 1

It is certified that error appears in the above-identified patent and that said Letters Patent is hereby corrected as shown below:

In column 2, line 21, delete "data" and insert -- data. --, therefor.

Signed and Sealed this
Eighteenth Day of December, 2012

David J. Kappos
*Director of the United States Patent and Trademark Office*